United States Patent
Forman et al.

(10) Patent No.: US 7,502,767 B1
(45) Date of Patent: Mar. 10, 2009

(54) COMPUTING A COUNT OF CASES IN A CLASS

(75) Inventors: George Henry Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 11/490,781

(22) Filed: Jul. 21, 2006

(51) Int. Cl.
*G06N 5/00* (2006.01)
(52) U.S. Cl. .......................................... 706/20; 702/19
(58) Field of Classification Search .................. 706/20; 702/19; 715/811; 435/4
See application file for complete search history.

(56) References Cited

U.S. PATENT DOCUMENTS 6,939,670 B2 * 9/2005 Pressman et al. ............... 435/4
6,964,023 B2 * 11/2005 Maes et al. .................. 715/811
7,171,311 B2 * 1/2007 Dai et al. ..................... 702/19

OTHER PUBLICATIONS

Forman, G., "Counting Positives Accurately Despite Inaccurate Classification", HP Labs, HPL-2005-96, Aug. 3, 2005, Internal Accession Date Only.
Latinne, P., Adjusting the Outputs of a Classifier to New a Priori Probabilities May Significantly Improve Classification Accurancy . . . downloaded Apr. 19, 2006.
Saerens, M., "Adjusting the Outputs of a Classifier to new a Priori Probabilities: A Simple Procedure", Neural Communication 14, 21-41, 2001 Massachusetts Institute of Tech.

* cited by examiner

*Primary Examiner*—Wilbert L Starks, Jr.

(57) ABSTRACT

A count of cases in a target set classified in a class is computed using a classifier. In the method, one or more measures of behavior of the classifier are determined for a plurality of classification thresholds and at least one classification threshold for the classifier is selected based on the one or more measures of behavior. In addition, a score for a plurality of the cases in the target set using the classifier is computed and the count of the cases is computed based on the scores, the selected at least one classification threshold, and the one or more measures of behavior.

20 Claims, 6 Drawing Sheets

COMPUTING A COUNT OF CASES IN A CLASS

RELATED APPLICATION

This application is related to the following commonly assigned and copending U.S. patent application Ser. No. 11/080,098, entitled "A METHOD OF, AND SYSTEM FOR, CLASSIFICATION COUNT ADJUSTMENT", filed on Mar. 14, 2005, the disclosure of which is hereby incorporated by reference in its entirety.

BACKGROUND

An automated classifier configured to predict which data items of a data set belong to one or more conceptual category subsets has been used to extract estimates of the subset sizes. An example of an automated classifier is one that is used to predict, or classify, whether a given document in a business news wire is related to a particular company of interest. Another example is an automated classifier used to determine under which topic each incoming news article should be filed.

In order to determine the percentage of articles filed under one particular category, the number of articles predicted by the classifier to belong in that category could be counted, and then divided by the total number of documents considered to obtain the percentage. Once the classifier has determined in which topic a particular article should reside, the results of the automated categorization are then aggregated to give overall estimates of the number of articles in each category. The number of articles belonging to a particular category is counted to, for instance, track the relative level of interest in a particular topic.

Automated classifiers have also been used by scientists and business analysts to obtain estimates of the number of items belonging to various categories. For instance, automated classifiers have been used to estimate how many genes in a database are predicted to exhibit some property.

Automated classifiers are typically trained with a training set of labeled cases (that is, cases for which the true category is known) to provide the classifier with the ability to determine whether a new item belongs to a particular category. Generally, providing relatively larger numbers of labeled training cases improves the accuracy of the classifiers. It is often difficult, however, to provide classifiers with a relatively larger number of labeled training cases because acquiring labeled training cases is usually associated with relatively high costs and typically requires a large amount of human effort. In addition, for relatively difficult classification problems, no amount of labeled training cases yields a perfectly accurate classifier.

As such, there often arise situations when the training set is substantially unbalanced, that is, training sets containing many more cases in some categories than in others. This often happens when cases belonging in one category of the overall population of cases are rare relative to the size of the overall population of cases. Unfortunately, automated classifiers often have difficulty when training on substantially unbalanced data. Such classifiers are prone to providing inaccurate results, which introduce biases in the estimates of the size of the category of interest.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring to embodiments thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for computing counts of cases in a target set with an automated classifier having a selected classification threshold. In a first example, the classification threshold is selected to comprise a threshold level that satisfies at least one condition. In certain instances, the selected threshold level worsens the ability of the automated classifier to accurately classify the individual cases; however, the accuracy in the overall count estimates of the cases classified into a particular class is improved. In addition, the automated classifier employs the selected classification threshold, along with various other criteria to determine whether the cases belong to the particular class. Moreover, one or both of a count and an adjusted count of the number of cases belonging to the target set is computed.

In a second example, multiple intermediate counts are computed using a plurality of alternative classification thresholds. In one example, some of the intermediate counts are removed from consideration and the median, average, or both, of the remaining intermediate counts are determined. The median, average, or both of the remaining intermediate counts are then used to calculate an adjusted count.

Through implementation of the embodiments disclosed herein, the number of cases contained in a target set belonging to one or more classes are determined with a relatively higher degree of accuracy in comparison with known counting algorithms, for instance, in situations where the training set of cases is substantially unbalanced.

Figure 1:
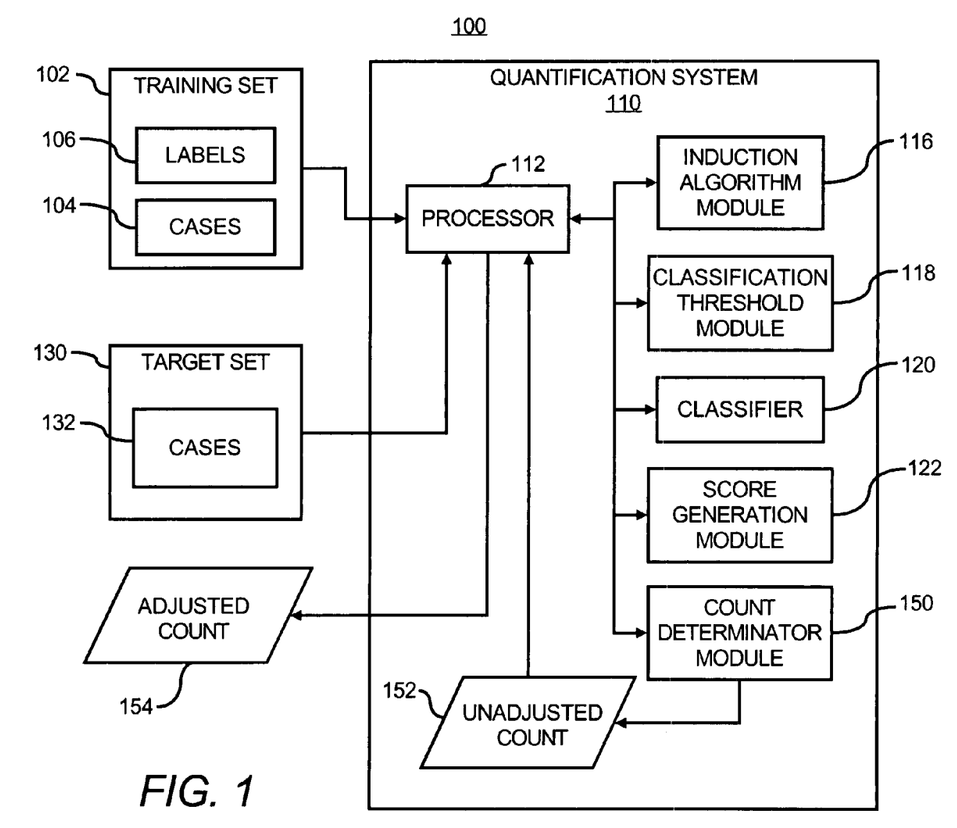
FIG. 1 shows an automated counting system operable to estimate a count of cases in a target set that belong to a category of interest, according to an embodiment of the invention.

With reference first to FIG. 1, there is shown an automated counting system 100 operable to compute from the target set 130, the adjusted count 154 of cases that belong to a category of interest, according to an embodiment. Although particular reference has been made herein below to the counting system 100 as including particular features, it should be understood that the counting system 100 may include additional components and that some of the components described herein may be removed and/or modified without departing from a scope of the counting system 100.

The counting system 100 generally operates to calculate the number of cases belonging to one or more categories or classes. As an example, the counting system 100 may be employed to count cases received in a help center. In this example, the counting system 100 is employed, for instance, to determine the greatest problem areas as well as problem trends over time by counting the number of cases identified in one or more problem categories over successive time periods.

As shown in FIG. 1, the counting system 100 includes a training set 102 having cases 104 and labels 106, which, for instance, identify the cases 104 as being positive or negative. A positive training case is a case that belongs to a category of interest and a negative training case is a case that does not belong to the category of interest. For example, if a case is a help desk incident and the category is hard-drive problems, a positive label indicates that the case is a hard-drive problem and a negative label indicates that the case is not related to hard drives.

The counting system 100 also includes a quantification system 110 having a processor 112 generally configured to perform various classification functions described herein. Moreover, the processor 112 is configured to operate in a training mode and a classification mode as described in greater detail herein below.

In the training mode, the processor 112 is configured to use the cases 104 and labels 106 in the training set 102 as inputs for an induction algorithm module 116 configured to train or otherwise generate the classifier 120. Examples of algorithms suitable for use in the induction algorithm module 116 include Naïve Bayes classifiers, Support Vector Machines (SVM), neural networks, or other known induction algorithms. In any regard, the processor 112 generally invokes the induction algorithm module 116 to generate a classifier 120. In addition, the trained classifier 120 inputs a case and predicts to which category it belongs.

More particularly, the trained classifier 120 generates a score that is, without loss of generality, likely greater for positive cases than for negative cases. Examples of scores, not by way of limitation, include a value between 0 and 1, inclusive, representing a probability of whether a case belongs to the category. The higher the score, the greater the probability the case is positive and thus belongs to the category, and the lower the score, the greater the probability that the case is negative and thus does not belong to the category. Other example scores may not be calibrated probabilities, but rather, uncalibrated numbers with any range. The scores tend to be larger for positives than for negatives, or can be made to be so related through a relatively simple functional transformation.

The trained classifier 120 compares the score to a classification threshold to decide whether to predict whether the case in question is positive or negative. In the case of an SVM classifier, the score is the signed distance from the decision plane, and the classification threshold is zero (0). In the case of the Naïve Bayes classifier, its output represents the probability the case belongs to the positive class and the classification threshold is typically 50%. In any regard, machine learning techniques often attempt to generate a classifier that has maximum accuracy at their default classification threshold.

The processor 112 uses a score generation module 122 to determine typical scores that the classifier 120 would be likely to generate for the cases 104 in the training set 102. In one example, the score generation module 122 implements any reasonably suitable known-manner cross-validation techniques to generate the scores for the cases 104.

According to one embodiment, the score generation module 122 implements a 50-fold cross-validation technique to generate the scores. In this technique, the training set 102 is partitioned in fifty equal portions, and, for each of the fifty portions, the learning algorithm is applied to the other forty-nine portions to train the classifier 120, which is then applied to generate a score for each of the cases in the remaining portion. In another embodiment, known-manner bootstrap techniques are used to generate the distribution of scores for positives and negatives.

From the set of scores from the positive training cases, the processor 112 generates an empirical curve of the false negative rate (FNR), which equals the percentage of positive training cases that are incorrectly predicted to be negative for each potential classification threshold (that is, the percentage of positive training cases scoring less than or equal to each observed score). The FNR is by definition the complement of the true positive rate (TPR), FNR=1−TPR. In addition, from the set of negative training cases, the induction algorithm module 116 generates an empirical curve of the false positive rate (FPR), which equals the percentage of negative training cases that are incorrectly predicted to be positive at each classification threshold (that is, the percentage of negative training cases scoring greater than each observed score). The FPR is by definition the complement of the true negative rate (TNR), FPR=1−TNR. Intuitively, lowering the classification threshold for the classifier 120 causes cases with lower scores to be classified as positives by the classifier 120. This causes both the FPR and the TPR to increase, and therefore the FNR to decrease.

Figure 2A:
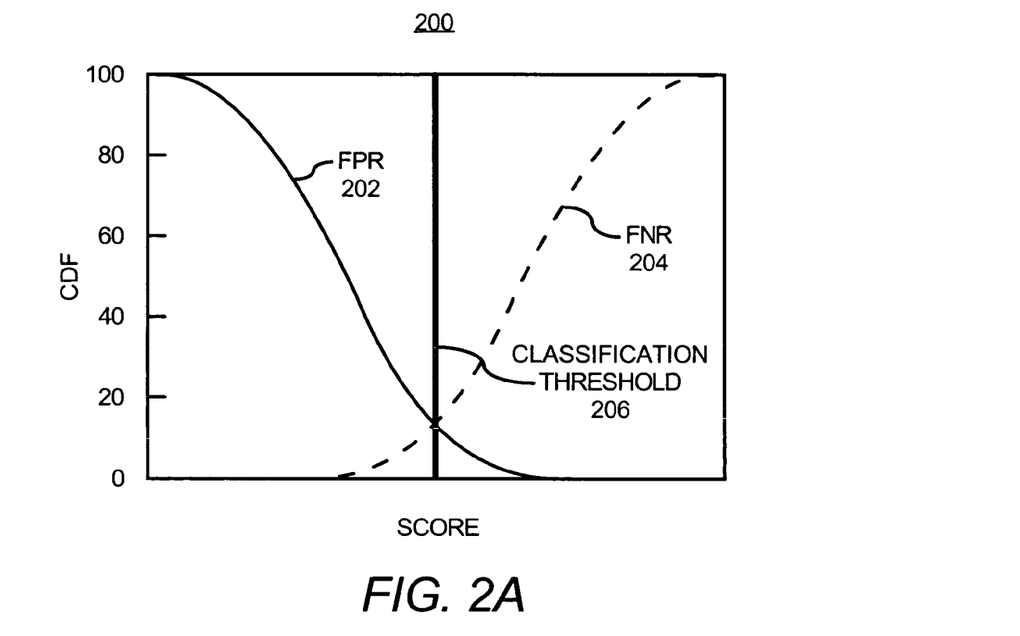
FIG. 2A shows an empirical curve for a classifier trained with a training set having a relatively balanced set of training cases, according to an embodiment of the invention.
Figure 2B:
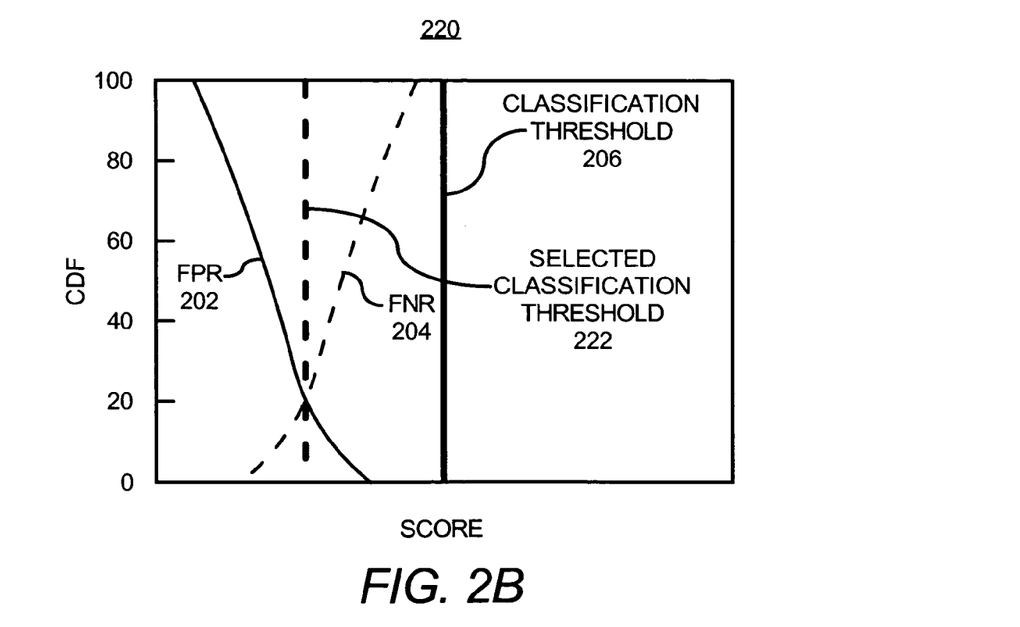
FIG. 2B shows an empirical curve for a classifier trained with a training set having a relatively unbalanced set of training cases, according to an embodiment of the invention.

The curves of the FNR 202 and the FPR 204 for a training set 102 having roughly 50% positive training cases 104 and roughly 50% negative training cases 104 are depicted in the graph 200 (FIG. 2A). In addition, the curves of the FNR 202 and FPR 204 for a training set 102 having a much smaller percentage of positive training cases 104 (for instance, about 2% positive training cases) and a much larger percentage of negative training cases (for instance, about 98% negative training cases) are shown in the graph 220 (FIG. 2B).

As shown in FIG. 2A, the default classification threshold 206 of the classifier 120 separates positives from negatives well, indicated by the low false positive rate FPR 202 and low false negative rate FNR 204 at that default classification threshold 206. However, in FIG. 2B, the default classification threshold 206 of the classifier 120 always predicts negative. In other words, the false positive rate FPR 202 is 0% and the false negative rate FNR 204 is 100%. Such a selection of the classification threshold 206 therefore leads to meaningless classification, and moreover thwarts methods to use the FPR 202 and FNR 204 of the classifier 120 to provide an adjusted count of the number of positives.

According to an embodiment, the processor 112 invokes the classification threshold module 118 to determine at least one selected classification threshold 222 (FIG. 2B) in order to resolve the problem described above. A single selected classification threshold 222 is depicted in FIG. 2B. In one embodiment, the classification threshold module 118 selects the classification threshold(s) 222 that satisfies at least one condition as described in greater detail herein below with respect to FIG. 4. In another embodiment, the classification threshold module 118 selects a plurality of alternative classification thresholds 222 as described in greater detail herein below with respect to FIG. 5.

Once the classifier 120 has been trained, the processor 112 is ready to operate in a classification mode. In this mode, the processor 112 invokes the classifier 120 to classify the cases 132 in a target set 130 to predict whether the cases 132 belong to the category or class of interest. In making the predictions, the classifier 120 generates a score for each of the cases 132.

In addition, the classifier 120 compares the respective scores of the cases 132 to the selected classification threshold(s) 222. As such, for instance, the classifier 120 would consider a score to be positive or negative through use of the selected classification threshold(s) 222; whereas all scores would have yielded a negative classification if the classification threshold 206 had been used. The classification threshold module 118 is configured to determine the selected classification threshold(s) 222 in any of a number of different manners, as also described in greater detail herein with respect to the methods described below.

Also shown in FIG. 1 is a count determinator module 150 that determines an unadjusted count 152 of the number of cases 132 in the target set 130 that meet one or more predetermined criteria, such as, the number of cases 132 having scores that exceed the selected classification threshold 222. In one example, the unadjusted count 152 is the number of cases 132 in the target set 130 that have been determined to be positive. The unadjusted count 152 is thus a number, a range or a percentage, such as, the proportion of the cases 132 in the target set 130 that are positive or an estimate of the positive cases 132. In another example, the unadjusted count 152 is the number of cases 132 in the target set 130 that are determined to be negative, when the predetermined criteria comprises negative cases.

According to an embodiment, the count determinator module 150 adjusts the unadjusted count 152 to provide a relatively more accurate, adjusted count 154, as disclosed, for instance, in co-pending and commonly assigned U.S. patent application Ser. No. 11/080,098, entitled "A METHOD OF, AND SYSTEM FOR, CLASSIFICATION COUNT ADJUSTMENT", filed on Mar. 14, 2005, the disclosure of which is hereby incorporated by reference in its entirety.

As disclosed in that application for patent, the number of positive cases (PC) or the adjusted count 154 of the cases categorized in a particular class is determined through the following equation:

$$PC = \frac{observed - FPR*total}{TPR - FPR}. \qquad \text{Equation (1)}$$

The term "observed" is the number of cases 132 in the target set 130 the classifier 120 has determined to be positive and has thus classified into the particular class (which may be the unadjusted count 152), "total" is the number of cases 132 in the target set 130, and FPR and TPR are the false positive rate and the true positive rate, respectively, of the classifier 120, as determined during the cross-validation of the classifier 120. Specifically, in FIG. 2B, FPR is determined, for instance, where the selected classification threshold(s) 222 crosses the FPR curve 202, and similarly, FNR is determined where the selected classification threshold(s) 222 crosses the FNR curve 204. In addition, by definition, TPR=1−FNR.

According to another embodiment, the percentage of positive cases or the adjusted count 154 of cases for a particular class is determined through the following equation:

$$pp' = \frac{(pp - FPR)}{(TPR - FPR)}. \qquad \text{Equation (2)}$$

In Equation (2), the term "pp" is the percent positive cases detected from the classifier 120 with its selected classification threshold 222 and the term "pp" is the adjusted percentage of positive cases.

Figure 3:
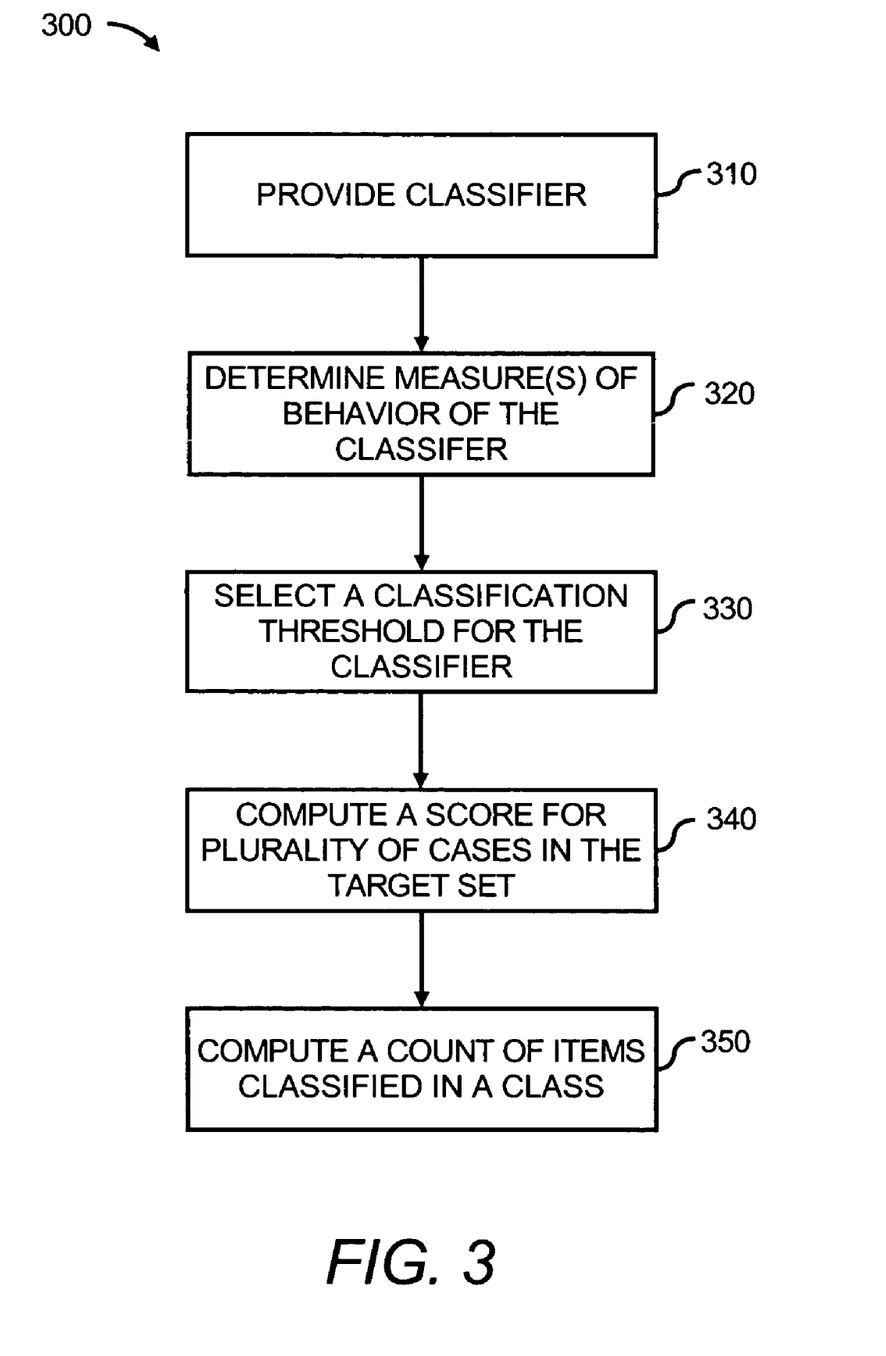
FIG. 3 shows a flow diagram of a method for computing a count estimate of cases in a target set classified in a class, according to an embodiment of the invention.

Turning now to FIG. 3, there is shown a flow diagram of a method 300 for computing a count of cases in a target set classified in a class, according to an embodiment. It is to be understood that the following description of the method 300 is but one manner of a variety of different manners in which an example of the invention may be practiced. It should also be apparent to those of ordinary skill in the art that the method 300 represents a generalized illustration and that other steps may be added or existing steps may be removed, modified or rearranged without departing from a scope of the method 300.

The description of the method 300 is made with reference to the elements depicted in FIG. 1, and thus makes reference to the elements cited therein. It should, however, be understood that the method 300 is not limited to the elements set forth in FIG. 1. Instead, it should be understood that the method 300 may be practiced by a system having a different configuration than that set forth in FIG. 1.

At step 310, a classifier 120 that is capable of producing a score based on a case and the class for which the count of cases is computed, is provided. At step 320, one or more measures of behavior of the classifier 120 are determined for a plurality of classification thresholds. The one or more measures of behavior generally indicate the ability of the classifier 120 to classify cases into the class. Examples of the one or more measures of behavior include a true positive rate (TPR) and a false positive rate (FPR), as discussed above. Other examples of the measures of behavior include an accuracy, a precision, a recall, a true negative rate, a false negative rate, a bi-normal separation, a lift, an F-measure, an area under an ROC curve, permutations of these measures of behavior, etc.

In one example, the TPR(C) of the classifier 120 for class C is obtained by calculating (given a set of cases for which it is known whether the cases truly belong to class C) the fraction of these cases assigned to class C out of all the cases that should have been assigned to class C. In other words, the TPR(C)=(the number of cases classified into class C that are truly in class C divided by the number of cases truly belonging to class C) where the classifications are made by the classifier 120. In addition, the FPR(C) of the classier 120 for a class C is obtained by calculating (given a set of cases for which it is known whether the cases truly belong to class C) the fraction of these cases that were incorrectly assigned by the classifier 120 to class C out of all of the cases not belonging in class C. In other words, FPR(C)=(the number of cases classified into class C that are truly not in class C divided by the number of cases that are truly not in class C), where the classifications are made by the classifier 120.

Figure 4:
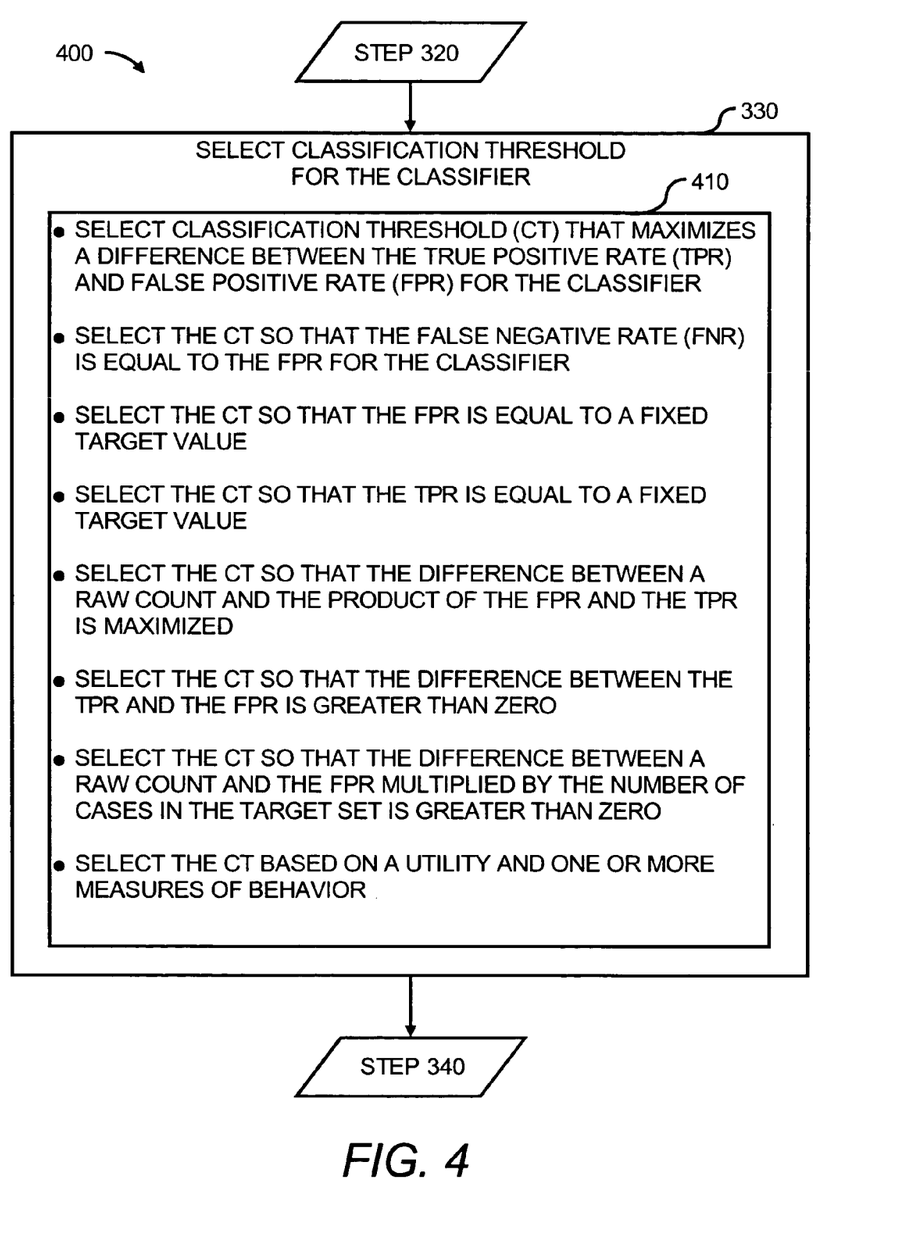
FIG. 4 depicts a flow diagram of a method for selecting the classification threshold in the method of FIG. 3, according to an embodiment of the invention.

At step 330, a classification threshold 222 is selected for the classifier 120 based upon the one or more measures of behavior. According to a first example, a classification threshold 222 that satisfies at least one condition as described in greater detail herein below with respect to FIG. 4 is selected. In another example, a plurality of alternative classification thresholds 222 is selected as described in greater detail herein below with respect to FIG. 5.

At step 340, a score for a plurality of the cases in the target set is computed using the classifier 120, in any of the manners described above. In addition, at step 350, a count of the cases classified into the class is computed based on the scores for the plurality of cases in the target set, the selected classification threshold 222, and the one or more measures of behavior, as described herein above.

In certain embodiments, step 350 includes the step of calculating an adjusted count 154 of the cases classified in the class. In these embodiments, the adjusted count 154 is computed using Equation (1), or its equivalent form, Equation (2), described above.

A more detailed description of some of the steps outlined in the method 300 is provided in the following flow diagrams.

With reference first to FIG. 4, there is shown a flow diagram of a method 400 for selecting the classification threshold 222, according to an embodiment of the invention. In this regard, the method 400 is a more detailed example of step 330 in FIG. 3.

As shown in FIG. 4, at step 410, according to an embodiment, the classification threshold 222 is selected according to at least one of the following criteria:
(a) the classification threshold 222 is selected to substantially maximize a difference between the true positive rate (TPR) and the false positive rate (FPR) for the classifier 120;
(b) the classification threshold 222 is selected so that the false negative rate (FNR) is substantially equal to the FPR for the classifier 120;
(c) the classification threshold 222 is selected so that the FPR is substantially equal to a fixed target value;
(d) the classification threshold 222 is selected so that the TPR is substantially equal to a fixed target value;
(e) the classification threshold 222 is selected so that the difference between a raw count and the product of the FPR and the TPR is substantially maximized;
(f) the classification threshold 222 is selected so that the difference between the TPR and the FPR is greater than a fixed target value;
(g) the classification threshold 222 is selected so that the difference between a raw count and the FPR multiplied by the number of cases in the target set is greater than a fixed target value; and
(h) the classification threshold 222 is selected based on a utility and one or more measures of behavior.

According to another embodiment, the classification threshold 222 is selected based upon prior probability and utilities of misdiagnosis. An example of a suitable manner in which the threshold of a classifier is set is discussed in Sox et al, *Medical Decision Making*, Butterworth-Heinemann, Boston, 1988, pp. 130-145, the disclosure of which is hereby incorporated by reference in its entirety. As discussed in that publication, the recommended value to substantially maximize the expected utility is to set the threshold so that:

$$\frac{dTPR}{dFPR} = \frac{u_{TN} - u_{FP}}{u_{TP} - u_{FN}} \cdot \frac{actual\_negatives}{actual\_positives}. \qquad \text{Equation (3)}$$

Equation (3) provides phrases selection of the threshold in terms of the slope of the Receiver-Operator Curve (dTPR/dFPR). In this equation, $u_{TN}$ is the utility of the true negatives, $u_{FP}$ is the utility of the false positives, $u_{TP}$ is the utility of the true positives, $u_{FN}$ is the utility of the false negatives, "actual_negatives" are the true negative cases 132 in the target set 130, and "actual_positives" are the true positive cases 132 in the target set 130. The slope value identified by Equation (3) is one that maximizes the expected utility. A utility, in this context, is a means known to those trained in the art of expressing the value or desirability of a particular result. Utilities are often expressed on a 0 to 1 scale, as positive or negative dollar values, or in other units.

An application of Equation (3) will now be provided with respect to the following example, In this example, the terms of the utilities of diagnosis, such as $u_{FP}$ and $u_{FN}$ are assumed to be such that $$\frac{u_{TN} - u_{FP}}{u_{TP} - u_{FN}}$$

is equal to 1. In other words, the numerator in this ratio is equal to the denominator, an assumption indicating that classification of positive and negative cases of the target set substantially equally of concern. In that case, the optimal selected classification threshold 222 should be set where the slope (dTPR/dFPR) equals the actual_negatives/actual_positives. In the example illustrated in FIG. 2B, where the training set 102 contained 2% positive cases, the slope (dTPR/dFPR) would be equal to 98/2=49. Therefore, the selected classification threshold 222 should be set at a place where the FPR curve 202 is relatively flat compared to the FNR curve 204.

The relatively large imbalance in the training set 102 is compensated for by considering the few cases that are positive as being relatively more important than the cases that are negative. For instance, if the utility quotient is 50, that is, the rare positive cases are considered, the $u_{TN}-u_{FP}$ is considered to equal 0.02 and the $u_{TP}-u_{FN}$ is considered to equal 1. According to this example, the selected classification threshold 222 should be set around where the slope (dTPR/dFPR) equals 1, that is, at a point where the decrease in the FPR curve 202 substantially matches the increase in the FNR curve 204.

Figure 5:
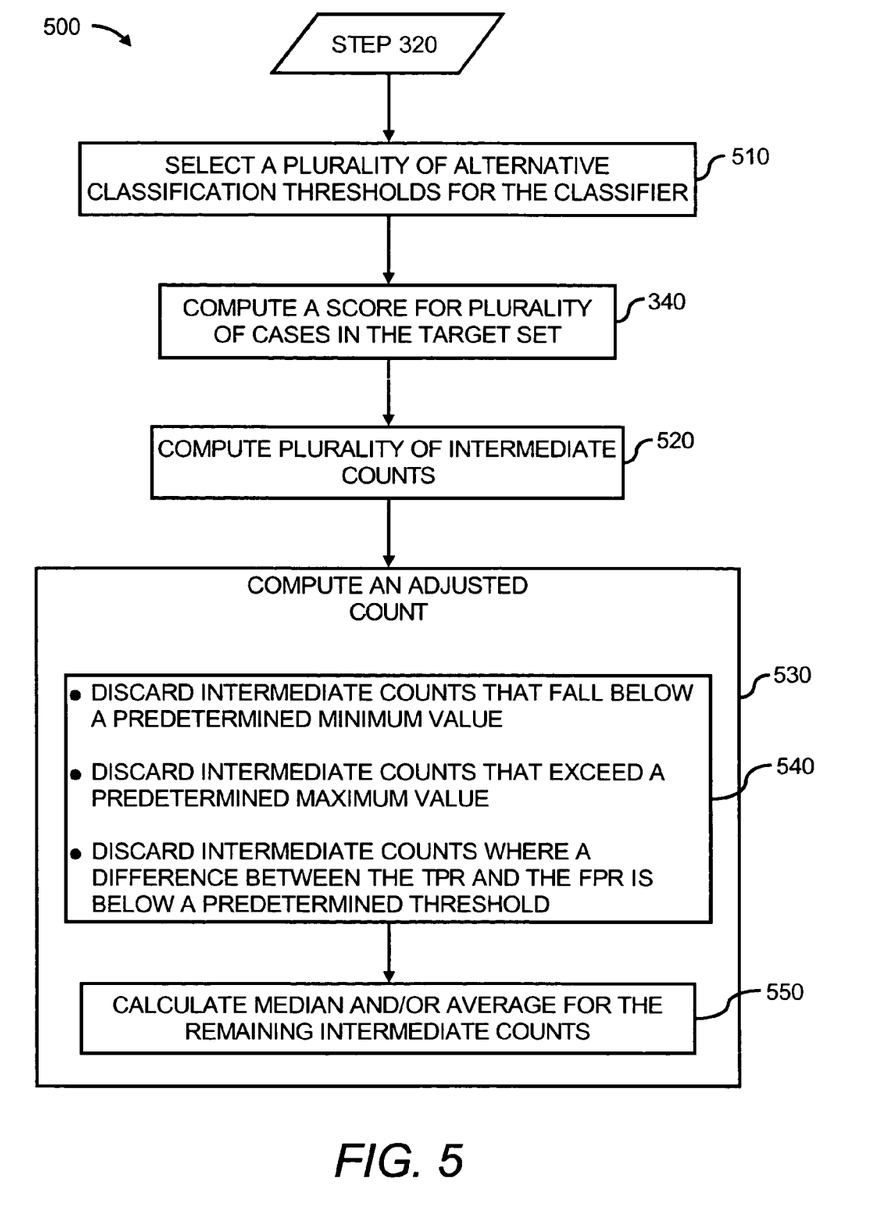
FIG. 5 depicts a flow diagram of a method for computing a count estimate of cases classified in a class in the method of FIG. 3, according to an embodiment of the invention.

With reference now to FIG. 5, there is shown a flow diagram of a method 500 for computing a count estimate of cases classified in a class, according to another embodiment of the invention. In this regard, the method 500 is another more detailed example of step 350 in FIG. 3.

As shown in FIG. 5, at step 510, a plurality of alternative classification thresholds 222 for the classifier 120 are selected. The plurality of alternative classification thresholds 222 comprise discrete points along a range of scores. For instance, the plurality of alternative classification thresholds 222 comprise scores ranging from a lowest score to a highest score in equal steps of 1%, in equal steps of between about 2%-10%, each score obtained during the training mode of the classifier 120, the scores of the cases 132 in the target set 130, etc.

In any regard, at step 340, a score for a plurality of the cases in the target set 130 is computed using the classifier 120, in any of the manners described above. In addition, at step 520, a plurality of intermediate counts of the number of cases in the target set 130 classified into the class is computed based on the scores for the plurality of cases in the target set 130, the plurality of alternative classification thresholds 222, and the one or more measures of behavior. In one embodiment, the plurality of intermediate counts for the plurality of alternative classification thresholds 222 are determined in manners similar to those described above with respect to step 350 (FIG. 3).

At step 530, an adjusted count of the number of cases in the target set 130 classified into the class based on the plurality of intermediate counts is computed. More particularly, for instance, and as indicated at step 540, the adjusted count is computed performing one or more of the following with the intermediate counts.

(a) Discarding intermediate counts that fall below a predetermined minimum value.
(b) Discarding intermediate counts that exceed a predetermined maximum value.
(c) Discarding intermediate counts where a difference between the TPR and the FPR is below a predetermined threshold.

According to an embodiment, the predetermined minimum value, the predetermined maximum, and the predetermined threshold are determined based upon one or more factors, such as, various values at which it is known that problems have occurred in the past in the counts, various values or ranges that are likely to cause incorrect counts based upon the intermediate counts, etc.

In addition, at step 550, one or both of the median and the average of the remaining intermediate counts are determined, and one or both of the median and the average comprises the adjusted count computed at step 350 (FIG. 3).

According to another embodiment, the method 300 is employed to obtain counts of cases that should classify into each of a plurality of classes. In this embodiment, the method 300 is performed independently for each class C (of the N classes) to calculate the number of percentage of cases that belong to class C vs. not class C. That is, the N-way multiclass problem is solved by first decomposing it into N different binary problems: class C vs. not C. In addition, a distribution of the counts across the plurality of classes is computed using the count estimates.

According to further embodiments, either or both of the methods 400 and 500 are performed in conjunction with the method 300 to make this determination.

In many instances, the total number of the counts for each of the N different classes may not total 100% of the cases 132 in the target set 130. As such, the final count for each class is normalized by their respective totals so that the total number adds up to 100% of the cases 132 in the target set 130, for instance, at step 350. In other words, the multi-class estimate of the percent of cases 132 in the target set 130 that belongs in class C is equal to the binary estimate of the percent of the cases 132 in the target set 130 that belong in class C divided by the sum of the binary estimates.

Some or all of the operations set forth in the methods 300, 400, and 500 may be contained as a utility, program, or subprogram, in any desired computer accessible medium. In addition, the method 300, 400, and 500 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Some or all of the methods 300, 400, 500 may be employed in a method for incident frequency analysis. More particularly, some or all of the methods 300, 400, 500 may be employed to analyze data to determine, for instance, how often one or more cases or situations in one or more categories are determined to have occurred. As another example, the data may be analyzed through some or all of the methods 300, 400, 500 over a period of time to determine trends in the data, such as the quantification of emerging categories of interest.

Thus, by way of example, some or all of the methods 300, 400, 500 may be employed in a help center to determine which categories of problems have the greatest number of occurrences, to determine the trends that the categories of problems are following, etc. In addition, therefore, this information may be used to predict which categories of interest require a greater level of attention as compared with other categories of interest.

Figure 6:
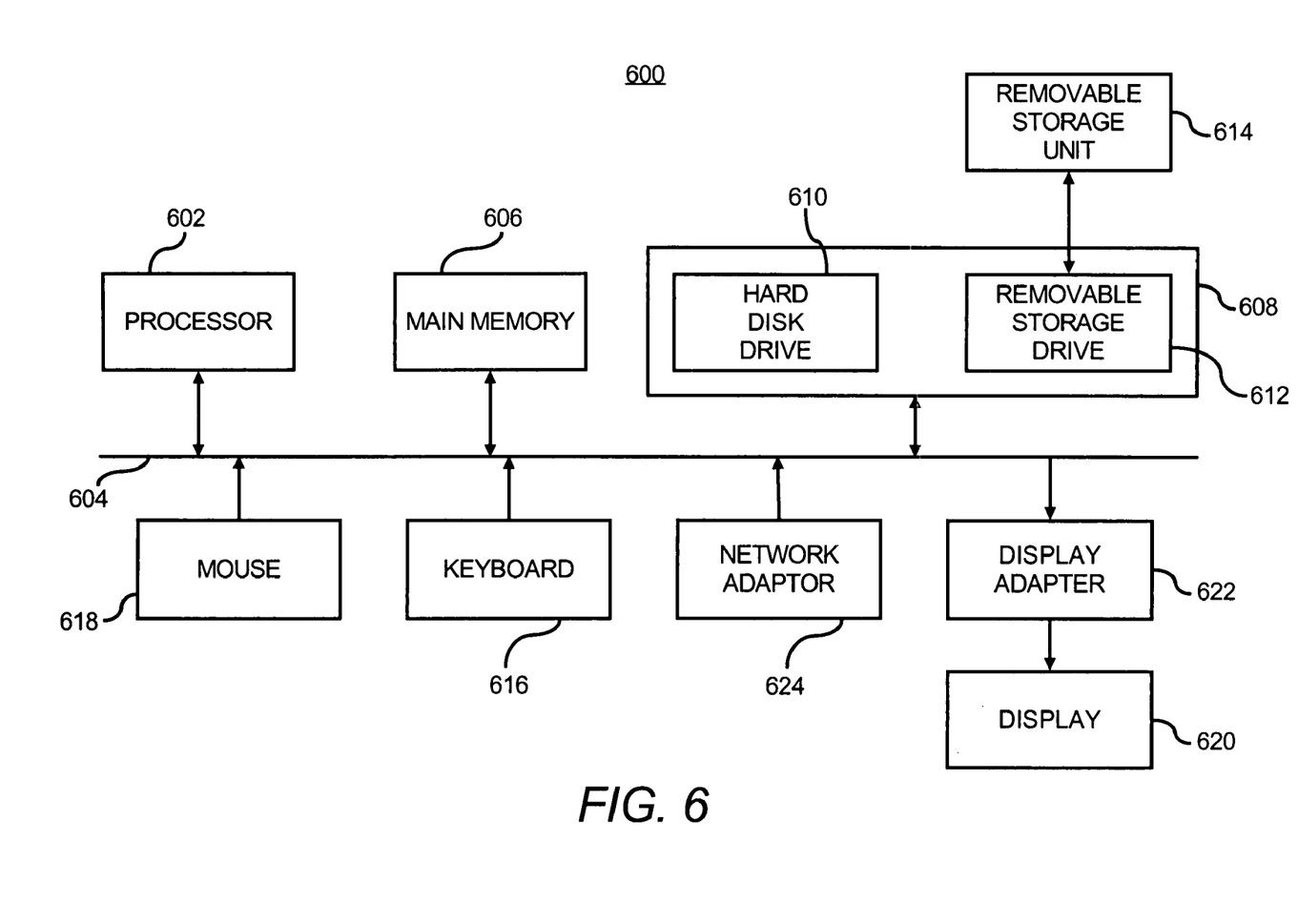
FIG. 6 illustrates a computer system, which may be employed to perform various functions described herein, according to an embodiment of the invention.

FIG. 6 illustrates a computer system 600, which may be employed to perform the various functions of the quantification system 110 described herein above, according to an example. In this respect, the computer system 600 may be used as a platform for executing one or more of the functions described hereinabove with respect to the quantification system 110.

The computer system 600 includes a processor 602 that may be used to execute some or all of the steps described in the methods 300, 400, and 500. Commands and data from the processor 602 are communicated over a communication bus 604. The computer system 600 also includes a main memory 606, such as a random access memory (RAM), where the program code for, for instance, the controller 304, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for counting cases in a target set may be stored.

The removable storage drive 610 may read from and/or write to a removable storage unit 614 in a well-known manner. User input and output devices may include, for instance, a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 600. In addition, the computer system 600 may include a system board or blade used in a rack in a data center, a "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-readable medium on which is embedded one or more computer programs, said one or more computer programs implementing a method for computing a count of cases in a target set classified in a class, said one or more computer programs comprising a set of instructions for:

providing a classifier capable of producing a score based on a case and the class;

determining one or more measures of behavior of the classifier for a plurality of classification thresholds, wherein the one or more measures of behavior indicate an ability of the classifier to classify cases into the class;

selecting at least one classification threshold for the classifier based on the one or more measures of behavior;

computing a score for a plurality of the cases in the target set using the classifier; and     computing a count of the cases in the target set classified into the class based on the scores for the plurality of cases in the target set, the selected at least one classification threshold, and the one or more measures of behavior.

2. The computer-readable medium according to claim 1, wherein the one or more measures of behavior include:

a false negative rate comprising the percentage of true positive rates that are incorrectly predicted to be negative;

a false positive rate, wherein the false positive rate comprises the percentage of true false rates that are incorrectly predicted to be positive; and     a true positive rate, wherein the true positive rate comprises the percentage of true positive rates that are correctly predicted to be positive.

3. The computer-readable medium according to claim 2, wherein selecting the classification threshold further comprises at least one of the following:

(a) selecting the at least one classification threshold to substantially maximize a difference between the true positive rate and the false positive rate for the classifier;

(b) selecting the at least one classification threshold so that the false negative rate is substantially equal to the false positive rate for the classifier;

(c) selecting the at least one classification threshold so that the false positive rate is substantially equal to a fixed target value;

(d) selecting the at least one classification threshold so that the true positive rate is substantially equal to a fixed target value;

(e) selecting the at least one classification threshold so that a difference between a raw count and the product of the false positive rate and the true positive rate is substantially maximized;

(f) selecting the at least one classification threshold so that the difference between the true positive rate and the false positive rate is greater than a fixed target value; and     (g) selecting the at least one classification threshold so that the difference between a raw count and the false positive rate multiplied by the number of cases in the target set is greater than a fixed target value.

4. The computer-readable medium according to claim 2, wherein computing the count further comprises calculating the adjusted count of positive cases (PC) in the class through the following equation:

$$PC = \frac{observed - FPR * total}{TPR - FPR},$$

wherein "observed" is the number of cases classified into the class by the classifier, "FPR" is the false positive rate of the classifier, "total" is the total number of cases in the target set, and "TPR" is the true positive rate of the classifier.

5. The computer-readable medium according to claim 2, wherein computing the count further comprises calculating an adjusted percentage of positive cases (pp') through the following equation:

$$pp' = \frac{(pp - FPR)}{(TPR - FPR)},$$

wherein "pp" is the percent of positive cases detected by the classifier, "FPR" is the false positive rate of the classifier, and "TPR" is the true positive rate of the classifier.

6. The computer-readable medium according to claim 1, wherein the cases comprise calls received in a help center and the target set comprises a problem topic of the help center.

7. The computer-readable medium according to claim 1, further comprising:

providing a utility; and wherein selecting the at least one classification threshold further comprises selecting the at least one classification threshold based on the utility and the one or more measures of behavior.

8. The computer-readable medium according to claim 1, further comprising:

selecting a plurality of alternative classification thresholds for the classifier;

computing a plurality of intermediate counts of the cases in the target set classified into the class based on the scores for the plurality of cases in the target set, the plurality of alternative classification thresholds, and the one or more measures of behavior; and     computing an adjusted count of the number of cases in the target set classified into the class based on the computed count and the plurality of computed intermediate counts.

9. The computer-readable medium according to claim 8, further comprising:

discarding intermediate counts that fall below a predetermined minimum value;

discarding intermediate counts that exceed a predetermined maximum value;

calculating at least one of the median of the remaining intermediate counts and the average of the remaining intermediate counts; and     wherein the adjusted count comprises the calculated at least one of the median of the remaining intermediate counts and the average of the remaining intermediate counts.

10. The computer-readable medium according to claim 8, further comprising:

discarding intermediate counts where a difference between the true positive rate and the false positive rate is below a predetermined threshold;

calculating at least one of the median of the remaining intermediate counts and the average of the remaining intermediate counts; and     wherein the adjusted count comprises the calculated at least one of the median of the remaining intermediate counts and the average of the remaining intermediate counts.

11. The computer-readable medium according to claim 1, further comprising:

computing counts of the cases in the target set classified into each of a plurality of classes; and computing a distribution of computed counts across the plurality of classes using the computed counts.

12. The computer-readable medium according to claim 11, wherein computing the distribution of computed counts across the plurality of classes further comprises normalizing the computed counts across the plurality of classes.

13. A method for analyzing cases received in a help center, said method comprising:
providing a classifier capable of producing a score based on a case and a category of interest;
determining one or more measures of behavior of the classifier for a plurality of classification thresholds, wherein the one or more measures of behavior indicate an ability of the classifier to classify cases into the category of interest;
selecting at least one classification threshold for the classifier based on the one or more measures of behavior;
computing a score for a plurality of cases received in the help center using the classifier;
computing a count of the cases received in the help center classified into the category of interest based on the scores for the plurality of cases received in the help center, the selected at least one classification threshold, and the one or more measures of behavior;
analyzing the count of the cases to at least one of determine a frequency at which the cases are classified into the category of interest and to quantify an emerging category of interest in the help center; and
storing the analyzed count of the cases.

14. The method according to claim 13, wherein the cases comprise calls received in the help center and the category of interest comprises a problem topic.

15. The method according to claim 13, wherein determining one or more measures of behavior further comprises determining the one or more measures of behavior from:
a false negative rate comprising the percentage of true positive rates that are incorrectly predicted to be negative;
a false positive rate, wherein the false positive rate comprises the percentage of true false rates that are incorrectly predicted to be positive; and
a true positive rate, wherein the true positive rate comprises the percentage of true positive rates that are correctly predicted to be positive.

16. The method according to claim 15, wherein selecting at least one classification threshold further comprises at least one of:
(a) selecting the at least one classification threshold to maximize a difference between the true positive rate and the false positive rate for the classifier;
(b) selecting the at least one classification threshold so that the false negative rate is equal to the false positive rate for the classifier;
(c) selecting the at least one classification threshold so that the false positive rate is equal to a fixed target value;
(d) selecting the at least one classification threshold so that the true positive rate is equal to a fixed target value;
(e) selecting the at least one classification threshold so that a difference between a raw count and the product of the false positive rate and the true positive rate is maximized;
(f) selecting the at least one classification threshold so that the difference between the true positive rate and the false positive rate is greater than zero; and
(g) selecting the at least one classification threshold so that the difference between a raw count and the false positive rate multiplied by the number of cases in the target set is greater than zero.

17. The method according to claim 15, further comprising:
providing a utility; and
wherein selecting the at least one classification threshold further comprises selecting the at least one classification threshold based on the utility and the one or more measures of behavior.

18. The method according to claim 13, further comprising:
selecting a plurality of alternative classification thresholds for the classifier;
computing a plurality of intermediate counts of the cases received in the help center classified into the category of interest based on the scores for the plurality of cases in the category of interest, the plurality of alternative classification thresholds, and the one or more measures of behavior; and
computing an adjusted count of the cases received in the help center classified into the category of interest based on the computed count and the plurality of computed intermediate counts.

19. The method according to claim 13, further comprising:
computing counts of the cases received in the help center classified into each of a plurality of categories of interest; and
computing a distribution of computed counts across the plurality of categories of interest using the computed counts.

20. A computer readable storage medium on which is embedded one or more computer programs, said one or more computer programs implementing a method for computing a count estimate of cases in a target set classified in a class, said one or more computer programs comprising a set of instructions for:
providing a classifier capable of producing a score based on a case and the class;
determining one or more measures of behavior of the classifier for a plurality of classification thresholds, wherein the one or more measures of behavior indicate the ability of the classifier to classify cases into the class;
selecting at least one classification threshold for the classifier based on the one or more measures of behavior;
computing a score for a plurality of the cases in the target set using the classifier;
computing a count of the cases in the target set classified into the class based on the scores for the plurality of cases in the target set, the selected at least one classification threshold, and the one or more measures of behavior; and
adjusting the computed count of cases.

* * * * *

UNITED STATES PATENT AND TRADEMARK OFFICE
CERTIFICATE OF CORRECTION

| | | |
|---|---|---|
| PATENT NO. | : 7,502,767 B1 | Page 1 of 1 |
| APPLICATION NO. | : 11/490781 | |
| DATED | : March 10, 2009 | |
| INVENTOR(S) | : George Henry Forman et al. | |

It is certified that error appears in the above-identified patent and that said Letters Patent is hereby corrected as shown below:

In column 6, line 49, delete "classier" and insert -- classifier --, therefor.

In column 9, line 24, delete "number of" and insert -- number or --, therefor.

Signed and Sealed this

Twenty-eighth Day of July, 2009

JOHN DOLL
*Acting Director of the United States Patent and Trademark Office*